(12) United States Patent
Zueck

(10) Patent No.: US 8,515,497 B2
(45) Date of Patent: Aug. 20, 2013

(54) VOICE FILE NAME GENERATION FOR CAPTURED IMAGES

(75) Inventor: Joseph M. Zueck, Carlsbad, CA (US)

(73) Assignee: KYOCERA Corporation, Kyoto (JP)

( * ) Notice: Subject to any disclaimer, the term of this patent is extended or adjusted under 35 U.S.C. 154(b) by 310 days.

(21) Appl. No.: 12/430,813

(22) Filed: Apr. 27, 2009

(65) Prior Publication Data
US 2010/0273458 A1 Oct. 28, 2010

(51) Int. Cl.
*H04B 1/38* (2006.01)
(52) U.S. Cl.
USPC ............ 455/563; 455/556.1; 348/231.2; 348/231.3; 348/231.5
(58) Field of Classification Search
None
See application file for complete search history.

(56) References Cited

U.S. PATENT DOCUMENTS

| | | | |
|---|---|---|---|
| 6,499,016 B1* | 12/2002 | Anderson | 704/275 |
| 2004/0041921 A1* | 3/2004 | Coates | 348/231.2 |
| 2006/0268100 A1* | 11/2006 | Karukka et al. | 348/14.01 |
| 2007/0294273 A1* | 12/2007 | Bendeck et al. | 707/101 |

OTHER PUBLICATIONS http://www.ehow.com/how_2175780_create-transcripts-using-voice-recognition.html.

* cited by examiner

*Primary Examiner* — German Viana Di Prisco

(57) ABSTRACT

A wireless handset, electronic device, and method for associating a text-based file identifier with a captured image using a voice recognition module are presented. The wireless handset or electronic device includes a camera, a memory, a microphone, a processor and a means for associating the text-based file identifier with the image that was captured by the camera. The memory stores the plurality of images captured by the camera. The microphone receives a plurality of voice messages. The processor records the voice messages and converts the voice message to a text-based file identifier at approximately the same time as when the image was captured by the camera.

16 Claims, 3 Drawing Sheets

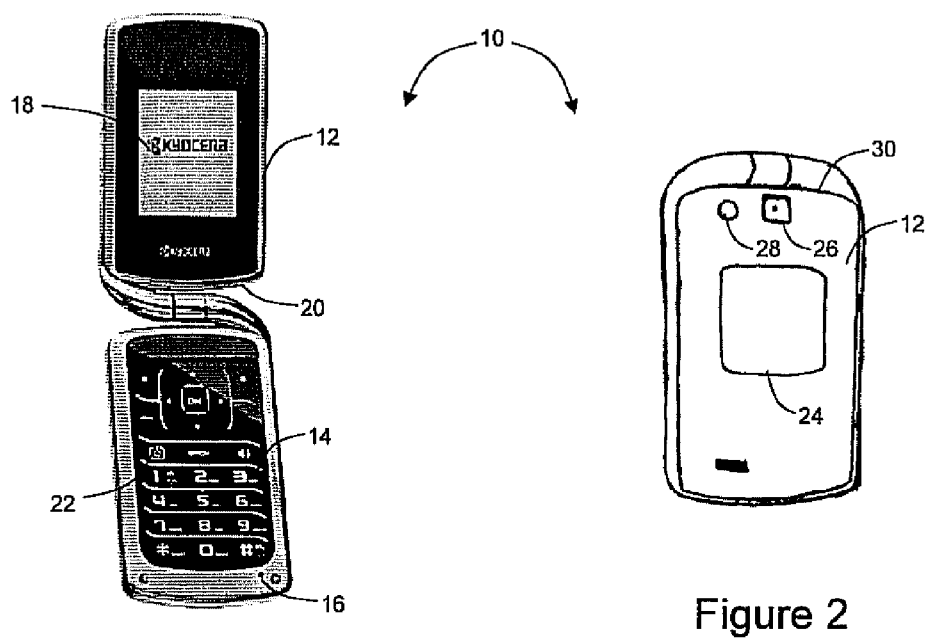
Figure 1
Figure 2
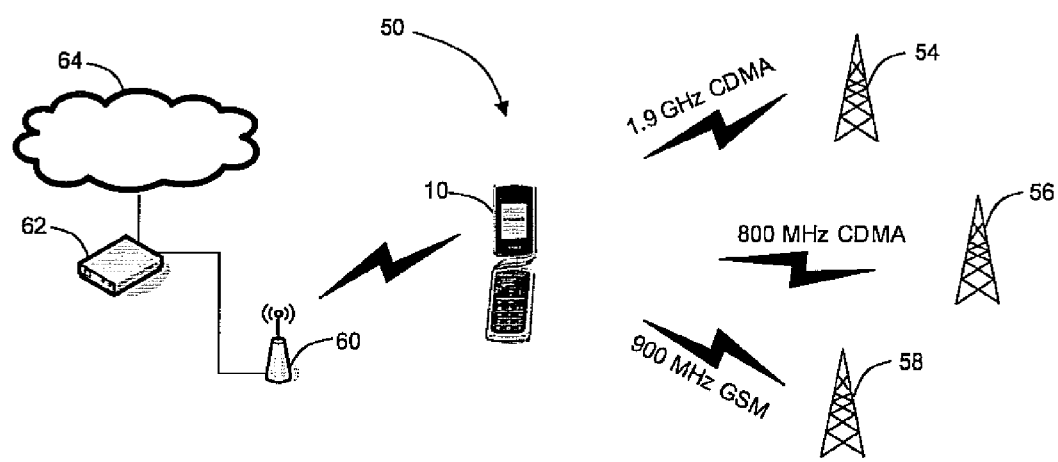
Figure 3

VOICE FILE NAME GENERATION FOR CAPTURED IMAGES

FIELD OF THE INVENTION

The present invention relates to voice file name generation for captured images. More particularly, the invention relates to a wireless handset that generates a file name for images using voice recognition and to associating a text-based file identifier with a captured image using an electronic device having a camera, a memory, a processor, a microphone, and a voice recognition module.

BACKGROUND

Consumers are increasingly demanding smaller feature rich wireless communication devices and other electronic devices. One of these features includes the ability to take pictures with a camera on the electronic device. Generally, the process of taking a photograph or video requires putting the device in a "camera" mode and then activating a switch to either take the picture or start recording the video. Typically, the same switch that is used to start recording a video is also used to stop recording. Depending on the type of camera, there may or may not be a removable memory component.

The recorded image or video is then stored on a memory associated with the device. Typically, the file name given to the picture or video is determined by the device and appears unintelligible. Although the user can personalize the file name, this process can be complicated because the device may not have a keypad, or the keypad may be small and difficult to use.

Often the current devices receive memory cards, e.g. Flash memory cards that generally do not allow personalization of file names. Furthermore, when a battery is reset, it is common for electronic camera devices to also reset the automatic generated file names; further complicating the process of naming an image or video file. Furthermore, the process of personalizing the names of images is complicated by the large number of files stored in the relatively large memory cards.

Associating an image or video with an intelligible file name generally requires opening and renaming each file one at a time, which is quite cumbersome. Thus, the current automated file naming process for results in a vast amount of files having unintelligible files names and conflicting number schemes that makes files challenging to identify.

SUMMARY

A wireless handset that generates file names for images using voice recognition is described. The wireless handset comprises a camera, a memory, a microphone, a processor and a means for associating the text-based file identifier with the image that was captured by camera. The camera is configured to capture a plurality of images and the memory stores the plurality of images captured by the camera. The wireless handset includes a microphone configured to receive a plurality of voice messages. The processor records the voice messages and converts the voice message to a text-based file identifier at approximately the same time as when the image was captured by the camera. Additionally, the means for associating one of the text-based file identifiers with the image that was captured by camera occurs at approximately the same time as when the image was captured by the camera.

An electronic device embodiment is presented that includes a camera, a memory, a microphone, a voice recognition module, a processor, a switch, and a voice generated picture file mode. The camera component captures a plurality of images. The memory stores the plurality of images captured by the camera. The microphone receives a plurality of voice messages that are recorded by the voice recognition module, which converts the voice message to a text-based file identifier. The processor then proceeds to associate the text-based file identifier with the image that was captured by the camera. In the illustrative embodiment, the switch is activated at approximately the same time as when the image was captured by the camera. When the voice generated picture file mode is triggered the voice generated picture file mode automatically activates the microphone to receive the voice message, activates the processor that records the voice message, converts the voice message to the text-based file identifier, and automatically associates the text-based file identifier with the captured image.

A method for associating a text-based file identifier with at least one captured image using an electronic device having a camera, a memory, a processor, a microphone, and a voice recognition module is also described. The method comprises capturing at least one image with the camera and storing the at least one image in the memory. The method then proceeds to receive at least one voice message from the microphone. The voice message is processed and converted to a text-based file identifier with the voice recognition module at approximately the same time as when the image was captured by the camera. The method then continues by associating the text-based file identifier with the image that was captured by the camera at approximately the same time as when the image was captured by the camera.

DRAWINGS

The present invention will be more fully understood by reference to the following drawings which are for illustrative, not limiting, purposes.

FIG. 1 shows an illustrative wireless handset in an open position.

FIG. 2 shows the illustrative wireless handset in a closed position.

FIG. 3 shows an illustrative communication system, in which the wireless communication device communicates using a variety of different standards.

DETAILED DESCRIPTION

Figure 4:
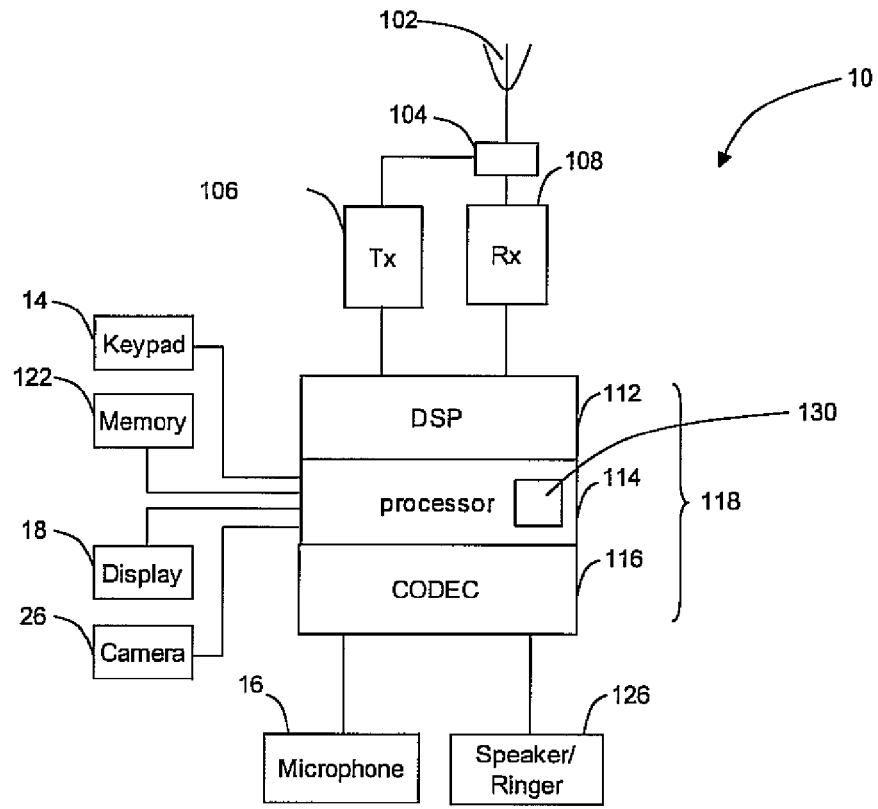
FIG. 4 shows a plurality of components associated with the illustrative wireless communication device.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the devices and methods described hereinafter may vary as to configuration and as to details.

An electronic device that generates a file name for images using voice recognition is described. By way of example and not of limitation, the illustrative electronic wireless device is a wireless handset. Additionally, a method for associating a text-based file identifier with the captured image is also described.

The illustrative wireless handset and electronic device both include a camera, a memory, a microphone, a processor and a voice recognition module. By way of example and not of limitation, the electronic device may be a digital camera that includes the camera, memory, microphone, processor and voice recognition module.

In one illustrative embodiment, a wireless handset embodiment is communicatively coupled to a network. The illustrative wireless handset is configured to receive updates or is capable of downloading files that re-program the wireless handset to generate a file name for images using voice recognition as described herein.

In operation, the microphone receives a voice message that recorded and converted to a text-based file identifier. The processor associates the text-based file identifier with the image that was captured by the camera.

In one illustrative embodiment, a switch can be activated to initiate a voice generated picture file mode at approximately the same time as when the image was captured by the camera. The voice generated picture file mode automatically activates the microphone to receive the voice message, activates the processor that records the voice message, converts the voice message to the text-based file identifier, and automatically associates the text-based file identifier with the captured image.

Referring to FIG. 1 there is shown a wireless handset in an open position with a hinge. The wireless communication device 10 includes a flip module or display housing member 12, a keypad 14, a microphone 16. The illustrative microphone is adjacent the keypad 14 and is configured to receive a plurality of voice messages.

In the illustrative embodiment, the display housing member 12 includes a first internal display 18 on the front face 20 of the flip module 12. The display 18 is configured to display the file identifiers and associated images. The keypad 14 includes input keys such as alphanumeric keys that can be used to input numbers or letters, and soft keys that perform functions displayed near the key, or other similar key arrangements.

Additionally, the illustrative keypad 14 includes a camera switch 22. The camera switch 22 is configured to capture images or video recorded from camera 26 shown in FIG. 2. Additionally, the camera switch 22 may be configured to start and stop a video.

By way of example and not of limitation, the illustrative camera switch 22 may also be a user activated switch that triggers a voice generated picture file mode. The voice generated picture file mode includes automatically activating the microphone to receive the voice message, automatically activating the processor to record the voice message, automatically converts the voice message to the text-based file identifier, and automatically associating the text-based file identifier with the captured image.

Referring to FIG. 2 there is shown the illustrative wireless handset in a closed position with the camera 26 and light sensor 28. The camera 26 is configured to capture images, videos, or any such combination. The light sensor 28 adjusts can be used to adjust the f-stop or shutter speed.

In the closed position, the back face 30 of the display housing member 12 is shown. In the closed position, the keypad 14, the camera switch 22 and the microphone 16 are covered by the display housing member 12. Thus for the illustrative embodiment, in the closed position the voice generated picture file mode cannot be activated.

A second external display 24 is on the back face 30 of the display housing member 12. The second external display 24 would typically be smaller than the first internal display 18. Additionally, the second external display 24 is adjacent the camera 26 in the illustrative wireless communication device 10. The camera 26 may be configured to capture images that are presented on one either of the displays 18 or 24.

Referring to FIG. 3 there is shown an illustrative communication system, in which the wireless communication device communicates using a variety of different standards. In the illustrative system 50, the wireless communication device 10 is a wireless handset that is configured to communicate with one or more base stations 54, 56 and 58 using different communication access technologies (CATs). The illustrative base stations may communicate with the wireless handset using a variety of different communication standards including, but not limited to, various forms of code division multiple access (CDMA), orthogonal frequency division multiple access (OFDMA), and time division multiple access (TDMA) wireless interfaces. By way of example and not of limitation, the wireless handset 10 communicates with base station 54 using a CAT that operates using CDMA technology at 1.9 GHz. The wireless handset 10 is also configured to communicate with base station 56 using a CAT that operates using CDMA at 800 MHz. Additionally, the illustrative handset 10 is configured to communicate with base station 58 using a CAT that operates using GSM technology at 900 MHz. The wireless handset 10 is also configured to monitor signals for a wireless local area network (WLAN) that may include a Wi-Fi access point 60 that is operatively coupled to a modem 62 that provides access to the Internet cloud 64.

The illustrative wireless communication device 10 is also referred to as a wireless handset, a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. Each CAT receiver module complies with a wireless standard having a receiver requirement. By way of example and not of limitation, the wireless standard is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX) or IEEE802.16. It shall be appreciated by those of ordinary skill in the art that the term wireless communication device, wireless handset, mobile handset, wireless phone, and mobile phone are interchangeable.

The networked wireless communication device 10 may be updated using a Firmware Over-the-air (FOTA) upgrade. Although FOTA is normally associated with bug fixes and with the typical handset container software defects, FOTA also holds the promise of allowing operators to update customers' handsets with new features and mobile services after the sale of the handset. Generally, FOTA refers to the process of allowing the software embedded in a mobile handset, i.e. firmware, to be updated wirelessly. FOTA technology allows for the creation of firmware updates that are compressed and transmitted over-the-air to the handset, and then decompressed and applied to the device firmware. Thus, in one embodiment the file naming feature described herein can be communicated as a FOTA upgrade. Alternatively, a software module may be downloaded directly to the electronic device wirelessly or from a wired connection.

Referring now to FIG. 4 there is shown a plurality of components associated with the illustrative wireless communication device. The illustrative multimode wireless handset 10 comprises a first antenna element 102 that is operatively coupled to a duplexer 104, which is operatively coupled to a multimode transmitter module 106, and a multimode receiver module 108. The antenna element 102 may be mounted on the display housing element, the keypad housing element 14, or a combination thereof.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the transmitter module and receiver module are typically paired and may be embodied as a transceiver. The illustrative transmitter 106, receiver 108, or transceiver may be housed in the display housing member, the keypad 14, or a combination thereof. The illustrative transmitter 106, receiver 108, or transceiver is operatively coupled to antenna element 102.

The DSP 112 may be configured to perform a variety of operations such as controlling the antenna 102, the multimode transmitter module 106, and the multimode receiver module 108. The processor 114 is operatively coupled to keypad 14, a memory 122, display 18, and camera 26. The memory is configured to store the images or video the plurality of images captured by the camera.

Additionally, the memory 122 may also include a portable memory that is not fixedly coupled to the wireless handset such as a flash memory. Flash memory includes memory and USB flash drives. Other such memory options shall suggest themselves to those of ordinary skill in the art having the benefit of this disclosure.

The processor 114 is also operatively coupled to the CODEC module 116 that performs the encoding and decoding operations and is communicatively coupled to a speaker or ringer 126 and to microphone 16. The CODEC module 116 is also communicatively coupled to the display 18 and provides the encoding and decoding operations for video.

The processor 114 is configured to record the voice messages received from microphone 16 and convert the voice message to a text based file identifier. The processor, having the appropriate software disposed thereon, then proceeds to associate the text-based file identifier with the image that was captured by camera 26.

In the illustrative embodiment, the processor 114 typically performs the recording and converting of the voice message to a text based file identifier at approximately the same time as when the image was captured by the camera 26. The memory 122 is configured to store the text-based file identifiers and the associated images. Alternatively, the processor 114 may perform the recording and converting of the voice message to a text based file identifier well after the image was captured by the camera 26, e.g. the next day.

A voice recognition module 130 is installed or downloaded onto the illustrative wireless device 10 and the processor 114 performs or manages the operations associated with the voice recognition module 130. By way of example and not of limitation, the voice recognition module 130 creates a voice profile for the person whose provides the voice message. A "training" phase may be then be initiated by the voice recognition module. The voice recognition module 130 proceeds to record the voice message that is received from microphone 16 and converts the voice message to text. The text is then converted to a text-based file identifier that is associated with the captured image or video.

Typically, this voice recognition module 130 is activated when the image or video is capture by the camera or at approximately the same time as when the image was captured by the camera. However, the voice recognition module 130 may also be activated at a later time. Additionally, the voice recognition module 130 can be used to name a group of images or videos so that the images do not have to be named one-by-one.

Figure 5A:
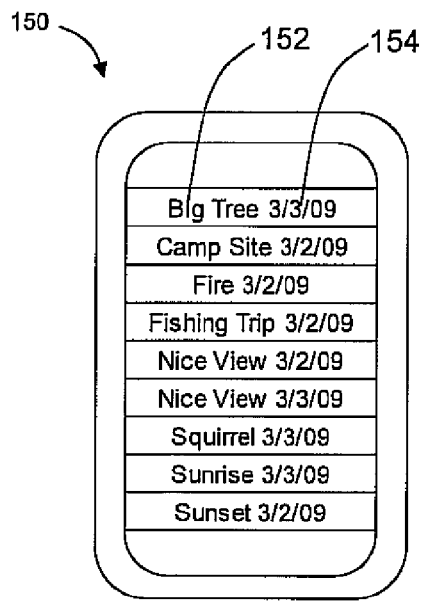
FIG. 5A shows an illustrative screen shot of text-based photograph file names organized alphabetically.

In FIG. 5A there is shown an illustrative screen shot of text-based photograph file names organized alphabetically. The illustrative screen shot 150 is presented on display 18 and shows personalized file names 152 with the associated date stamp 154. The file names 152 are organized in alphabetical order. Although not shown, a thumbnail image or group of thumbnail images may be associated with the file name may be presented.

Figure 5B:
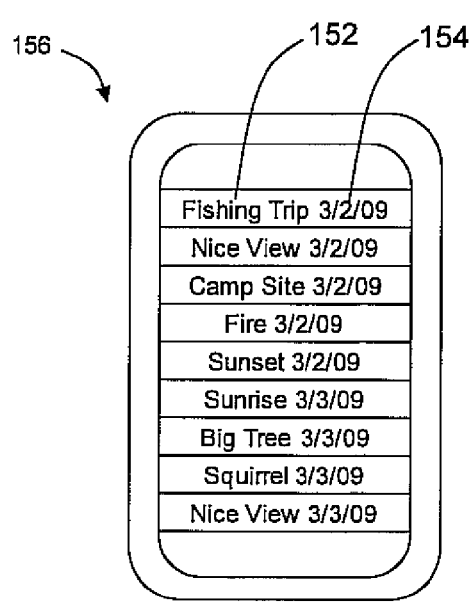
FIG. 5B shows an illustrative screen shot of text-based photograph file names organized chronologically.

In an alternative embodiment, FIG. 5B presents an illustrative screen shot 160 showing the text-based photograph file names organized chronologically. In this alternative embodiment, the file name 152 and date stamp 154 are organized chronologically according to a time stamp, even though only the date stamp is shown.

Figure 6:
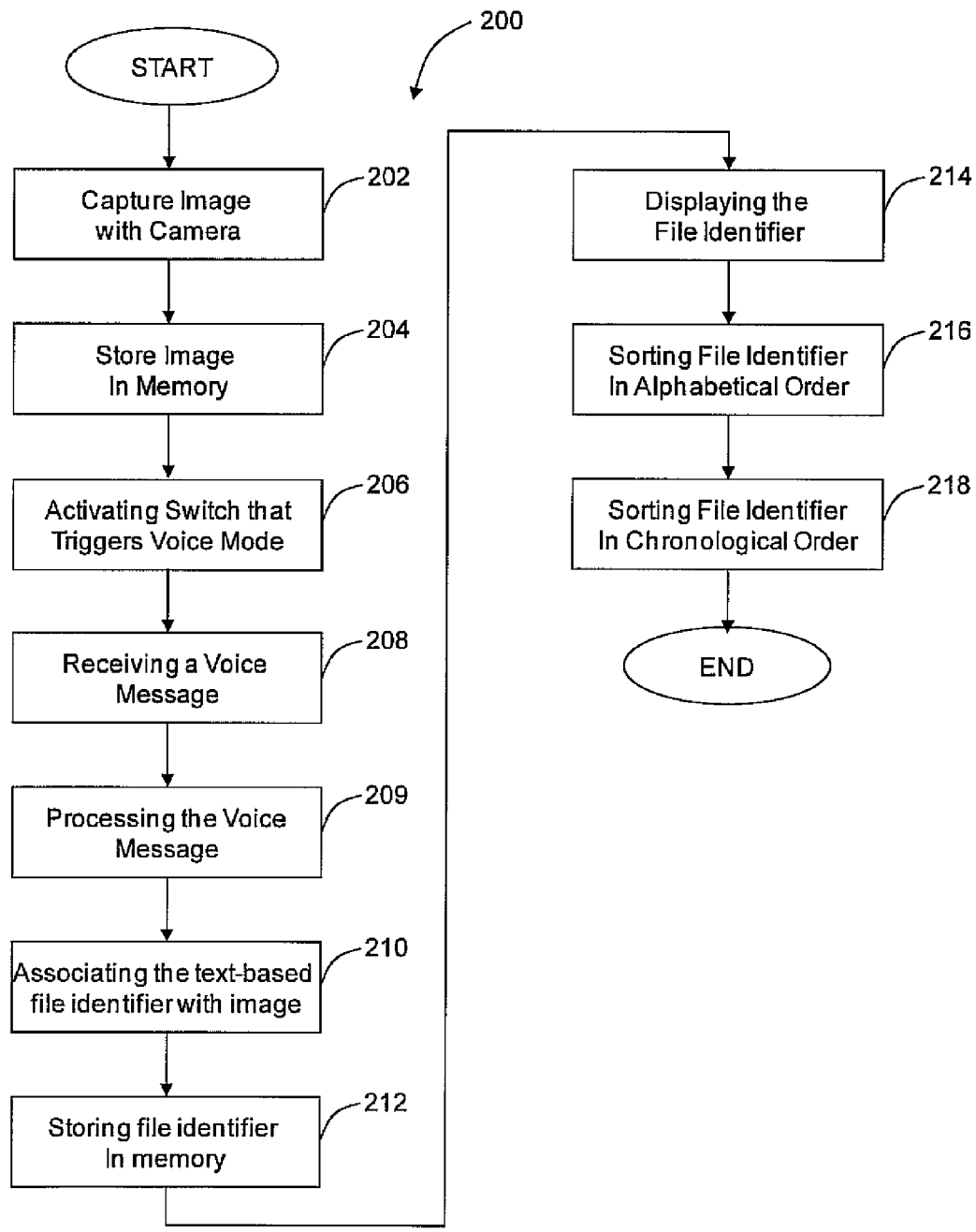
FIG. 6 shows an illustrative flowchart of a method for associating a text-based file identifier with at least one captured image using an electronic device.

Referring to FIG. 6 and well as FIG. 1, there is shown an illustrative flowchart of a method 200 for associating a text-based file identifier with at least one captured image using an electronic device. The method is associated with one or more captured images or video captured by an electronic device such as a wireless communications device. As described above, the electronic device for method 200 includes a camera, a memory, a processor, a microphone, and a voice recognition module.

The illustrative method is initiated at block 202 where at least one image is captured with the camera 26. The method then proceeds to block 204 where the images are stored in the memory 122.

At block 206, the switch 22 is activated that triggers a voice generated picture file mode after the user activates the switch. In one illustrative embodiment the switch automatically activates various steps associated with the voice generated picture file mode. These steps include automatically activating the microphone to receive the voice message, automatically activating the processor to record the voice message, automatically converting the voice message to the text-based file identifier, and automatically associating the text-based file identifier with the captured image.

Generally, the switch 22 is activated at approximately the same time as when the image was captured by the camera. However, there may be instances when the switch is activated before a group of images are captured, e.g. Trip to the Grand Canyon, and this general description is associated with a group of images. Additionally, there may be instances when the file names for the images are provided well after the image was capture, e.g. the next day.

In one embodiment, the switch 22 operations at block 206 are bypassed and the method proceeds to block 208. At block 208, a voice message is received from the microphone 16. The method then proceeds to block 209 where the voice message is processed and converted into a text-based file identifier with the voice recognition module 130.

Typically the processing of the voice message occurs when an image or video is captured by the camera 26. At block 210, the text-based file identifier is associated with the image that was captured by the camera 26. This process step occurs when the image is captured by the camera.

At block 212, the file identifiers and associated images are stored in the memory 122. The method continues to block 214 where file identifiers and the associated images are presented on the display 18. The file identifiers may then be sorted in alphabetical order as described in block 216 and described in further detail above in reference to FIG. 5A. Alternatively, the file identifiers may be sorted in chronological order as shown in block 218 and as described in further detail in FIG. 5B.

It is to be understood that the detailed description of illustrative embodiments are provided for illustrative purposes. The scope of the claims is not limited to these specific embodiments or examples. Various structural limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless handset comprising:
  a camera configured to capture a plurality of images responsive to a user-activated switch;
  a memory configured to store the plurality of images captured by the camera;
  a microphone configured to receive a plurality of voice messages;
  a downloaded voice recognition module configured to create a voice profile for the voice messages, wherein the voice recognition module includes a voice-generated picture file mode;
  a processor configured to record the voice messages immediately responsive to the user-activated switch and convert the voice message to a text-based file identifier based on the voice profile, wherein the voice recognition module is activated immediately responsive to the image being captured by the camera;
  a means for associating the text-based file identifier with the image that was captured by camera at approximately the same time as when the image was captured by the camera;
  the voice-generated picture file mode configured to be triggered as an immediate response to the image being captured by the camera when the switch is activated, wherein the voice generated picture file mode includes,
    automatically activating the microphone to receive the voice message,
    automatically activating the processor to record the voice message,
    automatically converting the voice message to the text-based file identifier, and
    automatically associating the text-based file identifier with the captured image; and
  a display for displaying a list that includes of at least one of the text-based file identifiers, wherein the list of text-based file identifiers occupies the entire display.

2. The wireless handset of claim 1 wherein the voice recognition module configured to convert the voice message to the text-based identifier that is associated with the image further comprises activating the voice recognition module after a plurality of images is captured by the camera.

3. The wireless handset of claim 2 wherein the memory is configured to store a plurality of file identifiers and the associated images.

4. The wireless handset of claim 3, wherein the means for associating the text-based file identifier with the image that was captured by camera further comprises a group of image configured to be named with a single text-based file identifier before the group of images is captured by the memory.

5. The wireless handset of claim 3 further comprising a sorting means configured to sort the file identifiers in an alphabet order.

6. The wireless handset of claim 3 further comprising a sorting means configured to sort the file identifiers in a chronological order.

7. An electronic device comprising:
  a camera configured to capture a plurality of images responsive to a user-activated switch;
  a memory configured to store the plurality of images captured by the camera;
  a microphone configured to receive a plurality of voice messages;
  a downloaded voice recognition module configured to create a voice profile for the voice messages, wherein the downloaded voice recognition module includes a voice generated picture file mode;
  wherein the voice recognition module configured to record the voice messages and convert the voice message to a text-based file identifier;
  a processor configured to associate the text-based file identifier with the image that was captured by the camera based on the voice profile;
  wherein the voice generated picture file mode that is triggered immediately responsive to the switch being activated, wherein the voice generated picture file mode includes,
    automatically activating the microphone to receive the voice message,
    automatically activating the processor to record the voice message,
    automatically converting the voice message to the text-based file identifier, and
    automatically associating the text-based file identifier with the captured image; and
  a display for displaying a list that includes at least one of the text-based file identifiers, wherein the list of text-based file identifies occupies the entire display.

8. The electronic device of claim 7 wherein the memory is configured to store a plurality of file identifiers and associated images.

9. The electronic device of claim 8, wherein the processor configured to associate the text-based file identifier with the image that was captured by the camera further comprises naming a group of images configured to be named with a single text-based file identifier before the group of images is captured by the memory.

10. The electronic device of claim 7 further comprising a sorting means configured to sort the file identifiers in an alphabet order.

11. The electronic device of claim 7 further comprising a sorting means configured to sort the file identifiers in a chronological order.

12. A method for associating a text-based file identifier with at least one captured image with an electronic device having a camera, a memory, a processor, a microphone, and a voice recognition module, the method comprising:
  downloading a voice recognition module configured to create a voice profile, the voice recognition module including a voice generated picture file mode;
  capturing at least one image with the camera responsive to a user activating a switch;
  storing the at least one image in the memory;
  receiving at least one voice message from the microphone immediately responsive to the user activating the switch;
  recording the voice message;

converting the voice message to a text-based file identifier with the voice recognition module based on the voice profile at approximately the same time as when the image was captured by the camera;

associating the text-based file identifier with the image that was captured by the camera at approximately the same time as when the image was captured by the camera;

triggering the voice generated picture file mode after the user activates the switch, wherein the voice generated picture file mode includes, automatically activating the microphone to receive the voice message, automatically activating the processor to record the voice message, automatically converting the voice message to the text-based file identifier, automatically associating the text-based file identifier with the captured image; and displaying a list that includes at least one of the text-based file identifiers, wherein the list of text-based file identifiers occupies the entire display.

13. The method of claim 12 further comprising storing a plurality of file identifiers and associated images in the memory.

14. The method of claim 13 further comprising naming a group of images with a single text-based file identifier before the group of images is captured by the memory.

15. The method of claim 12 further comprising sorting the file identifiers in alphabet order.

16. The method of claim 12 further comprising storing the file identifiers in chronological order.

* * * * *